United States Patent
Bi et al.

(10) Patent No.: US 9,651,266 B2
(45) Date of Patent: May 16, 2017

(54) GAS HOT WATER HEATING DEVICE AND SYSTEM

(71) Applicant: A. O. Smith Corporation, Milwaukee, WI (US)

(72) Inventors: Dayan Bi, Jiangsu (CN); Baolin Liu, Jiangsu (CN); Bu Qiu, Jiangsu (CN)

(73) Assignee: A. O. SMITH CORPORATION, Milwaukee, WI (US)

( * ) Notice: Subject to any disclaimer, the term of this patent is extended or adjusted under 35 U.S.C. 154(b) by 504 days.

(21) Appl. No.: 14/350,695

(22) PCT Filed: Sep. 20, 2012

(86) PCT No.: PCT/CN2012/081653
§ 371 (c)(1),
(2) Date: Apr. 9, 2014

(87) PCT Pub. No.: WO2013/053279
PCT Pub. Date: Apr. 18, 2013

(65) Prior Publication Data
US 2014/0230805 A1    Aug. 21, 2014

(30) Foreign Application Priority Data
Oct. 10, 2011   (CN) .......................... 2011 1 0306711

(51) Int. Cl.
*F24D 17/00* (2006.01)
*F24H 1/28* (2006.01)
(Continued)

(52) U.S. Cl.
CPC .......... *F24D 17/0068* (2013.01); *F24D 3/08* (2013.01); *F24D 17/0031* (2013.01);
(Continued)

(58) Field of Classification Search
CPC ................................................. F24D 17/0069
(Continued)

(56) References Cited

U.S. PATENT DOCUMENTS 4,300,536 A * 11/1981 Taschuk .............. F24D 17/0068
122/1 C
6,854,273 B1 * 2/2005 Lasley ...................... F01K 3/18
60/646

FOREIGN PATENT DOCUMENTS

| CN | 2402969 Y | 10/2000 |
|---|---|---|
| CN | 2639792 Y | 9/2004 |

(Continued)

OTHER PUBLICATIONS

International Search Report from International Application No. PCT/CN2012/081653, mailed Dec. 13, 2012 (English translation).
(Continued)

*Primary Examiner* — Avinash Savani
(74) *Attorney, Agent, or Firm* — Michael Best & Friedrich LLP

(57) ABSTRACT

A gas hot water heating device and a system with heating function are disclosed. The device includes a combustion device (1), an inlet (E) and an outlet (G) of a hot water pipeline (2), an inlet (I) and an outlet (H) of a heating loop (3), and a water tank (4). The device also includes a first heat exchanger (5), a second heat exchanger (6) and a third heat exchanger (7). A flue gas outlet (1-2) of the combustion device (1) is connected with flue gas passages of the first heat exchanger (5) and the second heat exchanger (6) in order and in series. A first water flow passage (5-1) and a second water flow passage (5-2) are arranged in the first heat exchanger (5), and the water tank (4) and the first water flow passage (5-1) of the first heat exchanger (5) are communicated between the inlet (E) and the outlet (G) of the hot water
(Continued)

pipeline (2) in series. The second heat exchanger (6) and the third heat exchanger (7) can exchange heat with water in the water tank (4).

13 Claims, 3 Drawing Sheets

(51) Int. Cl.
    *F24H 1/50*     (2006.01)
    *F24D 3/08*     (2006.01)
    *F24H 1/10*     (2006.01)
    *F24H 1/18*     (2006.01)
    *F24H 1/44*     (2006.01)
    *F24H 1/36*     (2006.01)
    *F24H 1/40*     (2006.01)

(52) U.S. Cl.
    CPC ............. *F24H 1/107* (2013.01); *F24H 1/186* (2013.01); *F24H 1/287* (2013.01); *F24H 1/36* (2013.01); *F24H 1/40* (2013.01); *F24H 1/44* (2013.01); *F24H 1/50* (2013.01); *Y02B 10/70* (2013.01)

(58) Field of Classification Search
    USPC ................................ 126/615; 122/14.3, 18.1
    See application file for complete search history.

(56) References Cited

FOREIGN PATENT DOCUMENTS

| | | |
|---|---|---|
| CN | 201396940 Y | 2/2010 |
| CN | 101688686 A | 3/2010 |
| CN | 102401422 A | 4/2012 |
| DE | 10033942 A1 | 2/2001 |
| EP | 0784191 A2 | 7/1997 |
| FR | 2722560 A1 | 1/1996 |
| GB | 2130347 A | 5/1984 |

OTHER PUBLICATIONS

Office Action from the Intellectual Property Office of the People's Republic of China for Chinese Application No. 201110306711.8 dated Oct. 10, 2013 (7 pages).

Rejection Decision from the Intellectual Property Office of the People's Republic of China for Chinese Application No. 201110306711.8 dated Jun. 23, 2014 (5 pages).

\* cited by examiner

GAS HOT WATER HEATING DEVICE AND SYSTEM

TECHNOLOGY FIELD

This invention relates to a kind of gas water heater, especially a kind of gas hot water heating device and system with the function of heating, which belongs to water heater technology.

TECHNOLOGY BACKGROUND

According to the knowledge made by the applicant, presently gas heating hot water heater occupies great market shares. The existing gas heating hot water heater is a kind of instantly available hot water heating equipment, and its basic structure contains two separated closed systems, one for heating by the user and the other for using hot water. Its defects are shown as: because this equipment can't store water, when the user plans to apply heating system and hot water system at the same time, temperature control of hot water supply system is difficult, especially when the temperature of incoming water is low and water consumption is great, the required hot water temperature can't be reached.

After search we found that the Chinese patent 200920126995 has represented a technical scheme combining gas hot water system with heating system, whose characteristics is to add a coil heat exchanger in water tank, to transfer the heat in water tank to heating route. Although this system structure is simple, heat exchange speed is slow because the heat exchange process from water tank to heating circulation is shown as water-water. For the users with high heating demand, heat exchange area must be very large; therefore volume of the water tank is unfit for the family users.

Invention Contents

Objective of this invention is to propose a kind of gas hot water heating device and system with compact structure, rapid heat exchange, supply of large amount of hot water and the function of heating aiming at the existing technical problems.

Basic technical scheme of the gas hot water heating device in this invention: it includes the combustion device, inlet and outlet of hot water pipeline, inlet and outlet of heating loop and water tank, as well as the first, the second and the third heat exchangers; flue gas outlet of the said combustion device is connected to the flue gas path of the first and the second heat exchangers in series according to sequence; the first and the second flow channels in the said first heat exchanger, the said water tank and the first flow channel in the first heat exchanger are connected in series between inlet and outlet of the said hot water pipeline; the second flow channel of the said first heat exchanger and flow channel of the third heat exchanger are connected in series between inlet and outlet of the heating loop; heat exchange can be realized between the said second & the third heat exchangers and the water inside water tank.

Basic technical scheme of the gas hot water heating system in this invention: it includes the combustion device, hot water pipeline, heating loop and water tank, as well as the first, the second and the third heat exchangers; flue gas outlet of the said combustion device is connected to the flue of the first and the second heat exchangers in series according to sequence; the first and the second flow channels in the said first heat exchanger, the said hot water pipeline and the said water tank and the first flow channel of the first heat exchanger are connected in series; the said heating loop is connected in series to the second flow channel of the said first heat exchanger and flow channel of the third heat exchanger; heat exchange can be realized between the said second & the third heat exchangers and the water inside water tank.

The above hot water heating device or system has described this invention from different angles, but practically it is to organically combine heat exchange system of gas heating hot water heater with water tank. During the operation, high temperature flue gas produced by the combustion device firstly exchanges a large amount heat through the first heat exchanger, then have heat exchange further through the second heat exchanger. It also can absorb the potential moisture and heat in flue gas, to greatly improve the thermal efficiency of system; heat exchange for hot water pipeline with the second heat exchanger is done in water tank, rapid heat exchange also can realized by means of the first heat exchanger, to supply large amount of hot water for users; the heat stored in water tank can be absorbed by heating loop through the third heat exchanger, to preheat the heating loop, then directly heat through the first heat exchanger, making full use of the heat for heating. The first heat exchanger is combined with water tank, and the water tank supplies hot water for the first heat exchanger or assists for heating, therefore volume of the water tank needn't to be too big and is suitable for household use.

The device is further perfected in this invention in that heat exchange can be done in the first heat exchanger between the water in the said hot water pipeline and that flowing in the said heating loop.

The device is furthered perfected in this invention in that the first and the second flow channels of the said first heat exchanger are respectively the inner pipe channel and the outer pipe channel which wraps partial inner pipe channel at least.

The device is further perfected in this invention in that the said inner and outer pipe channel are reverse ones, so that their mutual heat exchange effect will be better.

The device is further perfected in this invention in that inlet of the said hot water pipeline is water inlet of the said water tank and connected to water source, and outlet of the said hot water pipeline is connected to water end. Hot water pipeline enters the water tank from water source for pre-heating, then enters the first heat exchanger for heat exchange, making water temperature to rise rapidly; because the water tank can store some hot water, when the user needs great water consumption, it can makeup the demand of a lot of hot water can't be met only with the first heat exchanger.

The device is further perfected in this invention in that circulation branch between inlet and outlet of the said heating loop also is contained. The said circulation branch and the second flow channel of the said first heat exchanger as well as flow channel of the third heat exchanger form a circulation loop. When hot water is needed, water in water tank will be preheated through the third heat exchanger with the heat obtained by heating loop in the first heat exchanger, to provide more heat for hot water supply.

The device is further perfected in this invention in that ON/OFF control valve is provided in the said circulation branch.

The device is further perfected in this invention in that switching device to change flow direction inside the third heat exchanger is equipped. The third heat exchanger absorbs heat when heating loop works, while releases heat when hot water loop works. Under these two statuses, due to density difference of the water with different temperature, water in the water tank only shares a status, namely hot up and cold down therefore it is advantageous for improve heat exchange efficiency to adjust flow direction of the medium inside the third heat exchanger.

The device is further perfected in this invention in that the said heating branch is connected to the auxiliary heating branch in parallel, and the said auxiliary heating branch and the said third heat exchanger form a heating circulation loop. Combined with other energy systems, heat of other energy is stored in the water tank through the third heat exchanger, so as to further reduce energy consumption of the system.

The device is further perfected in this invention in that solar collector served as the auxiliary heating device is provided in the said auxiliary heating branch.

In a word the invention is of the following obvious advantages:

1) Exchange the heat in water tank and that of heating loop via the third heat exchanger, which can absorb the heat of water tank for heating, also release the heat obtained from heating loop to heat the water in water tank.

2) Preheat the cold water from water source via the water tank, then warm up it after heat exchange with the first heat exchanger, to further quicken temperature rise. At the same time, a certain amount of hot water can be stored in water tank, to satisfy the demand of a large amount of hot water consumption of the user.

3) Residual heat of the flue gas can be completely absorbed by the second heat exchanger, which will be stored in water tank and is more beneficial to make the best of heat energy.

DESCRIPTIONS OF ATTACHED DRAWINGS

EMBODIMENT

Detailed descriptions are made for several embodiments of this invention in combination with figures.

Embodiment 1

Figure 1:
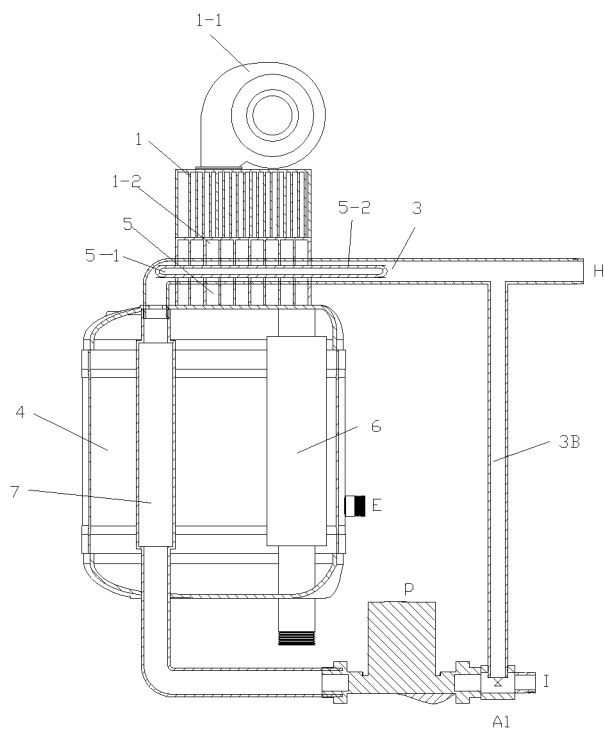
FIG. 1 shows the structural schematic of Embodiment 1 of this invention.
Figure 2:
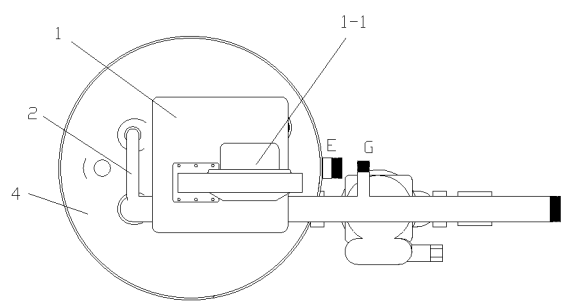
FIG. 2 shows the top view of the embodiment in FIG. 1.
Figure 3:
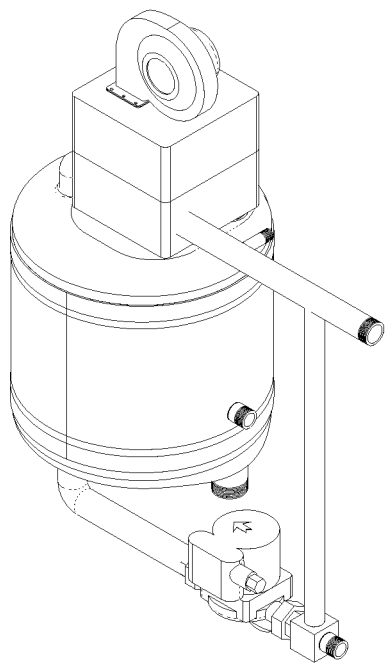
FIG. 3 shows the spatial structural schematic of the embodiment in FIG. 1.

The gas hot water heating device of this embodiment is shown as FIGS. 1, 2 and 3, including combustion device 1, inlet E and outlet G of hot water pipeline 2, inlet I and outlet H of heating loop 3 as well as water tank 4, and the first heat exchanger 5, the second heat exchanger 6 and the third heat exchanger 7. Flue gas outlet 1-2 of combustion device 1 is connected in series to the flue gas path of the first heat exchanger 5 and the second heat exchanger 6 according to sequence. Inner pipe channel 5-1 served as the first flow channel and outer pipe channel 5-2 wrapping the inner pipe channel served as the second flow channel are provided in the first heat exchanger 5. Inner and outer pipe channel are respectively connected to hot water pipeline 2 and heating loop 3, which form the reverse channel mutually, therefore water in hot water pipeline 2 will have heat exchange with water flowing through heating loop 3 in the first heat exchanger 5. Water tank 4 and the first flow channel 5-1 of the first heat exchanger 5 are connected in series between inlet E and outlet G of hot water pipeline 2, and the second flow channel 5-2 of the first heat exchanger 5 and flow channel of the third heat exchanger 7 are connected in series between inlet I and outlet H of heating loop 3.

Heat exchange can be done between the second heat exchanger 6 & the third heat exchanger 7 and the water in water tank 4, which not only is in water tank 4, but also is closely adjacent to it. Inlet E of hot water pipeline 2 is water inlet of water tank 4 and it is connected to water source. Outlet G of hot water pipeline 2 is connected to the water end. Circulation branch 3B is provided between inlet I and outlet H of heating loop 3, which forms a circulation loop together with the second flow channel 5-2 of the first heat exchanger 5 and the flow channel of the third heat exchanger 7. ON/OFF control valve A1 is equipped in the circulation branch.

It is more easily to understand the working principle and beneficial effects in embodiment 2, then no more details will be provided. Please refer to the related descriptions in Embodiment 2.

Embodiment 2

Figure 4:
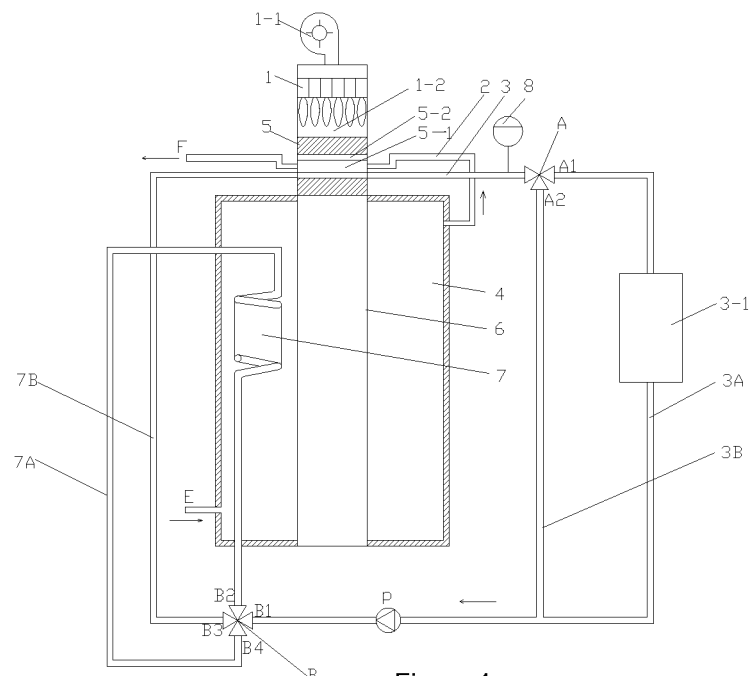
FIG. 4 shows the system structural schematic of Embodiment 2 of this invention.

The gas hot water heating system of this embodiment is shown as FIG. 4, including combustion device 1, hot water pipeline 2, heating loop 3, water tank 4 and the first heat exchanger 5, the second heat exchanger 6 and the third heat exchanger 7 (direct impact heat exchanger). Fan 1-1 is equipped on the top of combustion device 1, and flue gas outlet 1-2 of the lower combustion chamber is connected in series to flue gas path of the first heat exchanger 5 and the second heat exchanger 6. Water source E of hot water pipeline 2 is connected to water inlet of water tank 4, and water outlet of water tank 4 is connected to the water end F of hot water pipeline after the first heat exchanger 5. The heating loop 3 is connected in series with the flow channels of the first heat exchanger 5 and the third heat exchanger 7. The second heat exchanger 6 and the third heat exchanger 7 are both located inside water tank 4, therefore they can have heat exchange with the water inside water tank 4.

The first heat exchanger 5 practically is double-tube heat exchanger, provided with inner pipe channel 5-1 and outer pipe channel 5-2 wrapping the inner pipe flow channel. Hot water pipeline 2 flows through inner pipe channel 5-1 and heating loop 3 flows through outer pipe channel 5-2, then heat exchange can be realized in the first heat exchanger 5 between water in hot water pipeline 2 and that in heating loop 3. And inner pipe channel 5-1 and outer pipe channel 5-2 are reverse channels. In this embodiment, the first heat exchanger also can be divided into two single-channel heat exchange tubes, and hot water pipeline and heating loop separately pass through them. During the practical manufacturing, it is obvious that the first heat exchanger can be designed as multi-channel heat exchange pipeline. FIG. 8 is expansion water tank.

In service, hot water pipeline 2 providing domestic water is an open system, water process is shown as source of tap water→water tank→the first heat exchanger (inner pipe channel)→user terminal (shower head, etc). Heating loop 3 providing heating water is a closed system, water process is shown as heating equipment at user terminal (radiation fins, etc)→circulation water pump P→the third heat exchanger→the first heat exchanger (outer pipe channel)→heating equipment at user terminal, expansion tank will be used as pressure balance device in the loop; Flue gas process is shown as combustion device→flue gas path of the first heat exchanger→flue gas path of the second heat exchanger- →flue gas exhaust. Hot water pipeline exchanges heat with the second heat exchanger in water tank, also executes rapid heat exchange via the first heat exchanger, to supply large amount of hot water for user; heating loop absorbs the heat saved in water tank through the third heat exchanger to preheat the water in heating loop, then directly heat via the first heat exchanger, making full use of the heat for heating. High temperature flue gas produced by the combustion device firstly exchanges large amount of heat through the first heat exchanger, then makes heat exchange via the second heat exchanger. Also it can absorb the potential moisture heat in flue gas, to greatly improve the thermal efficiency of system.

Heating loop 3 includes heating branch 3A passing through heating equipment 3-1 and heating branch 3A as well as circulation branch 3B connecting the first heat exchanger 5 and the third heat exchanger 7, which are controlled by valve. Heating branch 3A and circulation branch 3B are connected in parallel. Heating loop 3 is of a control valve A to switch circulation branch 3B and heating branch 3A. In particular, two-position three-way valve A is provided at the junction of circulation branch and heating branch in heating loop 3, to switch the two branches by means of two switching positions A1 and A2 of valve A. Additionally, heating loop 3 also is equipped with the switching device to change flow direction inside the third heat exchanger 7. In terms of details, the switching device is four-way valve B with four ports such as B1, B2, B3 and B4. Both ends of the third heat exchanger 7 are connected to B2 and B4 respectively, while those of the heating loop are connected to B1 and B3 respectively, therefore top-in-bottom-out or bottom-in-top-out of the third heat exchanger 7 can be realized through status connection of B1-B4 and B2-B3 or B1-B2 and B3-B4 of control valve. It is evident that this switching device also can be applied in Embodiment 1.

When the heating loop works during service, A1 position of valve A opens, A2 position closes, B1-B2 and B3-B4 of valve B are connected, and cold water from the heating equipment of user terminal enters the third heat exchanger for heat absorption from bottom to top via B1-B2, then enters the first heat exchanger for heat exchange via B3-B4, finally enters the heating equipment at users terminal for heating through A1 position of valve A. Because the first heat exchanger is able to absorb the heat releasing from the second heat exchanger to water tank, to avoid heat accumulation, too high water temperature and pressure inside the water tank when heating is applied only, so as to eliminate the potential safety hazards. When the heating branch stops and circulation branch is working, A1 position of the valve closes, while A2 position opens, and B1-B4 and B2-B3 of valve B is connected. Under the circumstances, high temperature heating hot water from the first heat exchanger enters circulation branch 3B through A2 position of valve A, then enters the third heat exchanger from top to bottom via B1-B4 to release heat for the cold water in water tank. Finally enters the first heat exchanger again for heat exchange via B2-B3. Too high water temperature of the heating loop in the first heat exchanger can be effectively avoided by means of transferring the heat absorbed by heating loop in the first heat exchanger to water tank via the third heat exchanger. At the same time, heating speed can be rapidly improved by preheating the cold water inside water tank, which is very beneficial to the users with large capacity of domestic water.

Embodiment 3

Figure 5:
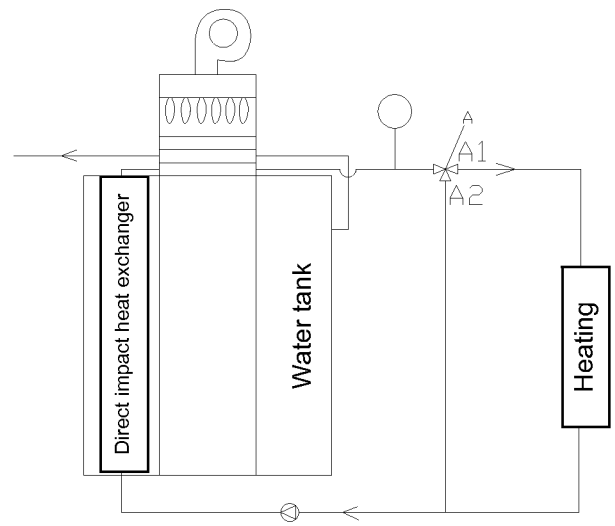
FIG. 5 shows the system structural schematic of Embodiment 3 of this invention.

The gas hot water heating system in this embodiment is shown as FIG. 5, its basic structure is the same as that of Embodiment 1, with a difference in the simplified pipeline on both sides of the third heat exchanger, therefore it can't switch the flow direction of the third heat exchanger, with poor heat exchange efficiency.

Embodiment 4

Figure 6:
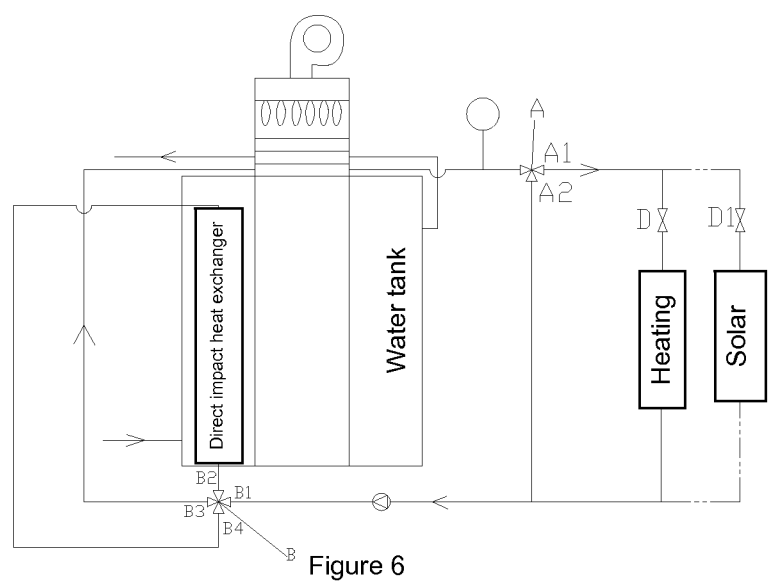
FIG. 6 shows the system structural schematic of Embodiment 4 of this invention.

The gas hot water heating system in this embodiment is shown as FIG. 6, its basic structure is the same as that of Embodiment 1, with a difference in that heating branch is connected to auxiliary heating branch in parallel. This auxiliary heating branch forms a heating circulation loop together with the said third heat exchanger. For this embodiment, the auxiliary heating branch is equipped with solar collector served as auxiliary heating device (also the auxiliary heating device of other energy can be set as required). Therefore the heat of solar collector can be transferred to the water tank via the third heat exchanger in combination with the green energy system, so as to reduce energy consumption of the system further.

Besides the above embodiments, other manners can be executed for this invention. The technical schemes formed on the basis of equivalent replacement or transformation will be within the protection scope required by this invention.

The invention claimed is:

1. A gas hot water heating device comprising:
    a combustion device;
    an inlet and an outlet of a hot water pipeline;
    an inlet and an outlet of a heating loop;
    a water tank;
    a first heat exchanger;
    a second heat exchanger;
    a third heat exchanger;
    a flue gas outlet of the combustion device is connected to a flue gas path of the first and the second heat exchangers in series according to sequence; the first heat exchanger has a first flow channel and a second flow channel, and the water tank and the first flow channel of the first heat exchanger are connected in series between the inlet and the outlet of the hot water pipeline; the second flow channel of the first heat exchanger and a flow channel of the third heat exchanger are connected in series between the inlet and the outlet of the heating loop; wherein heat exchange can be realized between the second and the third heat exchangers and the water inside the water tank, wherein heat exchange is done in the first heat exchanger between the water flowing in the hot water pipeline and that flowing in the heating loop.

2. The gas hot water heating device according to claim 1, wherein the first and the second flow channels of the first heat exchanger are respectively an inner pipe channel and an outer pipe channel which wraps at least part of the inner pipe channel.

3. The gas hot water heating device according to claim 2, wherein the inner pipe channel and the outer pipe channel are reverse channels.

4. The gas hot water heating device according to claim 1, wherein the inlet of the hot water pipeline is a water inlet of the water tank and is connected to a water source, and the outlet of the hot water pipeline is connected to a water end.

5. The gas hot water heating device according to claim 1, further including a circulation branch between the inlet and the outlet of the heating loop, the circulation branch, the second flow channel of the first heat exchanger, and the flow channel of the third heat exchanger form a circulation loop.

6. The gas hot water heating device according to claim 5, wherein an ON/OFF control valve is provided in the circulation branch.

7. The gas hot water heating device according to claim 1, further including a switching device to change flow direction inside the third heat exchanger.

8. A gas hot water heating system comprising:
   a combustion device;
   a hot water pipeline;
   a heating loop;
   a water tank;
   a first heat exchanger;
   a second heat exchanger;
   a third heat exchanger;
   a flue gas outlet of the combustion device is connected to a flue gas path of the first and the second heat exchangers in series according to sequence; the first heat exchanger has a first flow channel and a second flow channel, the hot water pipeline, the water tank and the first flow channel of the first heat exchanger are connected in series; the heating loop and the second flow channel of the first heat exchanger and a flow channel of the third heat exchanger are connected in series; wherein heat exchange can be realized between the second and the third heat exchangers and the water inside the said water tank, wherein heat exchange is done in the first heat exchanger between the water flowing in the hot water pipeline and that flowing in the heating loop.

9. The gas hot water heating system according to claim 8, wherein a heating branch is also contained in the heating loop, and a circulation branch which forms a circulation loop connecting with the second flow channel of the first heat exchanger and the flow channel of the third heat exchanger when the heating branch is closed.

10. The gas hot water heating system according to claim 9, wherein a control value to switch the circulation branch and the heating branch is provided in the heating loop.

11. The gas hot water heating system according to claim 8, wherein a switching device to change the flow direction inside the third heat exchanger is provided in the heating loop.

12. The gas hot water heating system according to claim 8, wherein the heating branch is connected to an auxiliary heating branch in parallel, and the auxiliary heating branch and the third heat exchanger are connected to form a heating circulation loop.

13. The gas hot water heating system according to claim 12, wherein a solar heat collector serves as an auxiliary heating device and is provided in the auxiliary heating branch.

* * * * *